United States Patent
Lin et al.

(10) Patent No.: US 8,821,031 B2
(45) Date of Patent: Sep. 2, 2014

(54) OPTICAL FIBER ADAPTER WITH SHUTTER MEMBER

(75) Inventors: Sung An Lin, Miaoli County (TW); Sung Chi Lin, Miaoli County (TW)

(73) Assignee: Ezontek Technologies Co., Ltd., Xinzhuang, Taipei County (TW)

( * ) Notice: Subject to any disclaimer, the term of this patent is extended or adjusted under 35 U.S.C. 154(b) by 133 days.

(21) Appl. No.: 13/418,456

(22) Filed: Mar. 13, 2012

(65) Prior Publication Data

US 2012/0321266 A1 Dec. 20, 2012

(30) Foreign Application Priority Data

Jun. 14, 2011 (TW) .............................. 100120638 A (51) Int. Cl.
*G02B 6/00* (2006.01)
(52) U.S. Cl.
USPC .............................................. 385/59; 385/92
(58) Field of Classification Search
USPC .................................................... 385/59, 92
See application file for complete search history.

(56) References Cited

U.S. PATENT DOCUMENTS

| | | | |
|---|---|---|---|
| 6,004,043 A * | 12/1999 | Abendschein et al. | ......... 385/76 |
| 6,264,374 B1 * | 7/2001 | Selfridge et al. | ............... 385/78 |
| 6,352,375 B1 * | 3/2002 | Shimoji et al. | .................. 385/92 |
| 6,461,054 B1 | 10/2002 | Iwase | |
| 6,793,399 B1 * | 9/2004 | Nguyen | .......................... 385/53 |
| 7,703,987 B2 * | 4/2010 | Kramer et al. | .................. 385/55 |
| 7,837,395 B2 * | 11/2010 | Lin et al. | ......................... 385/58 |
| 7,972,066 B1 | 7/2011 | Lin et al. | |
| 2005/0281509 A1 | 12/2005 | Cox et al. | |
| 2005/0286833 A1 * | 12/2005 | Kramer et al. | .................. 385/55 |
| 2007/0019265 A1 * | 1/2007 | Park et al. | ....................... 359/18 |
| 2007/0019913 A1 * | 1/2007 | Iwai et al. | ....................... 385/56 |
| 2007/0098330 A1 | 5/2007 | Ozawa et al. | |
| 2007/0117457 A1 * | 5/2007 | Kramer et al. | ................ 439/595 |
| 2009/0060422 A1 | 3/2009 | Lin et al. | |
| 2009/0226141 A1 * | 9/2009 | Lin et al. | ....................... 385/134 |

FOREIGN PATENT DOCUMENTS

JP          2006284897 A         10/2006

* cited by examiner

*Primary Examiner* — Kaveh Kianni
(74) *Attorney, Agent, or Firm* — Lowe Hauptman & Ham, LLP (57) ABSTRACT

An optical fiber adapter according to the present disclosure includes a main body, an inner housing, a cover plate and an elastic shutter member. The optical fiber adapter of the present disclosure may obstruct the light beams emitted from an accommodation room of the main body thereby preventing the eyes from exposure to the light beams.

8 Claims, 6 Drawing Sheets

OPTICAL FIBER ADAPTER WITH SHUTTER MEMBER

CROSS REFERENCE TO RELATED APPLICATION

This application claims the priority benefit of Taiwan Patent Application Serial Number 100120638 filed Jun. 14, 2011, the full disclosure of which is incorporated herein by reference.

BACKGROUND OF THE INVENTION

1. Field of the Invention

The present invention relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Figure 1:
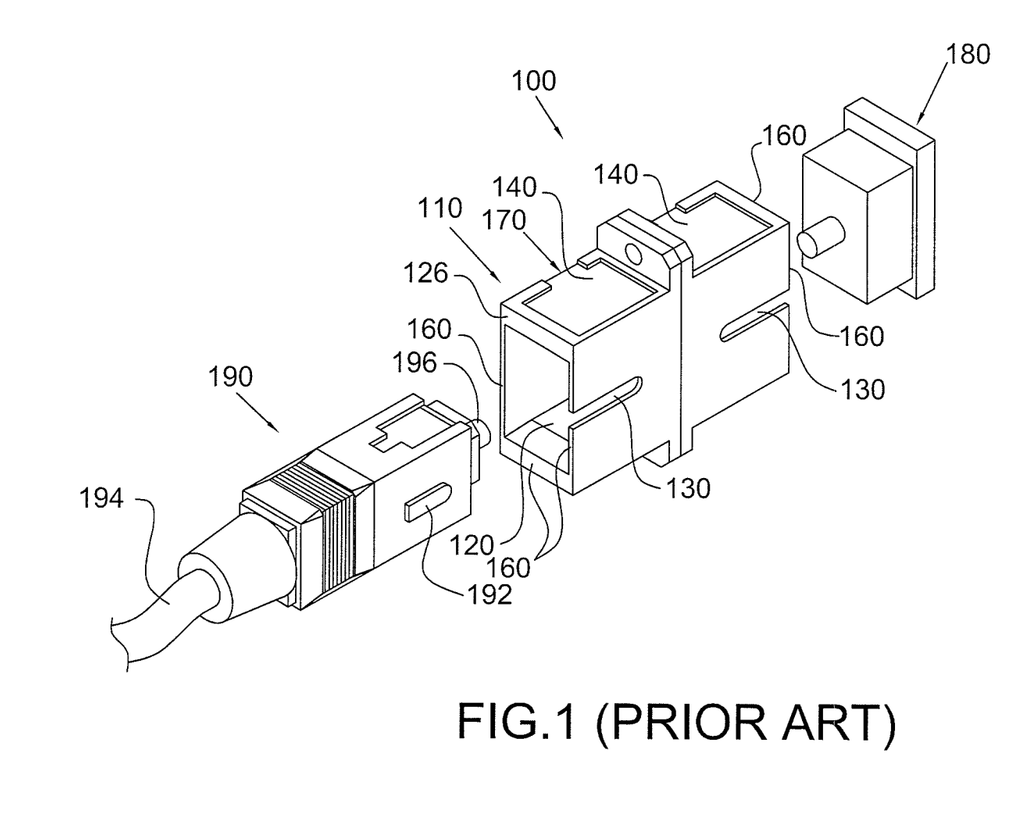
FIG. 1 is an elevated perspective view illustrating a conventional optical fiber adapter and a conventional optical fiber connector.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Figure 2:
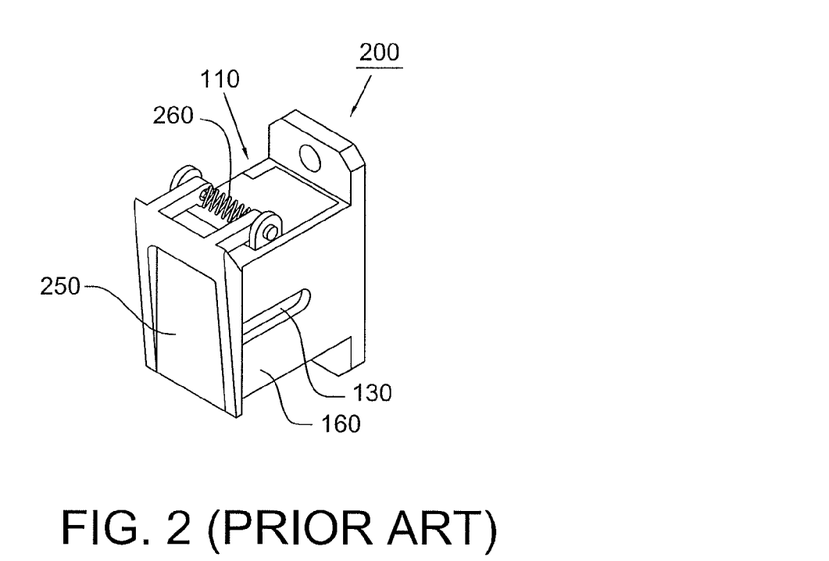
FIG. 2 is an elevated perspective view of a conventional optical fiber adapter with a cover for obstructing the light beams emitted from the receiving recess.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Figure 3:
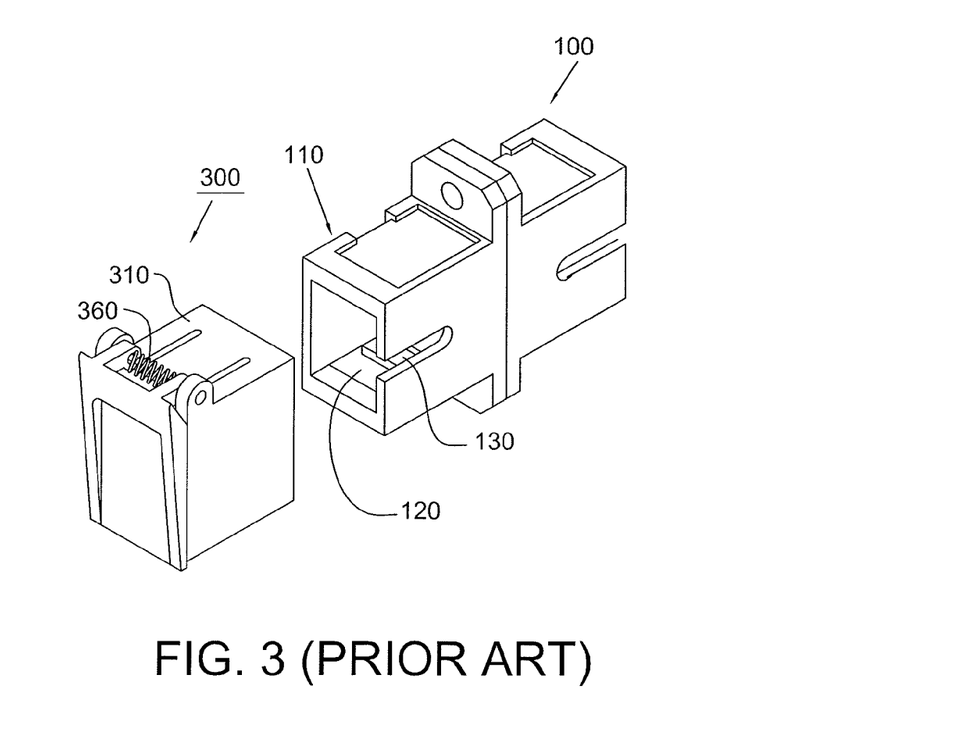
FIG. 3 is an elevated perspective view of a conventional protection cap for an optical fiber adapter.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY OF THE INVENTION

The present disclosure provides a shutter member for an optical fiber adapter that may obstruct the light beams emitted from the accommodation room thereby preventing the eyes from exposure to the light beams.

In one embodiment, the optical fiber adapter of the present disclosure includes a main body, an inner housing, a cover plate and an elastic shutter member. The main body has an accommodation room defined by a first wall, a second wall, a third wall and a fourth wall, wherein the first wall faces the third wall and connects with the second and fourth walls. The accommodation room of the main body has two opposing axial openings. An access opening is provided on the first wall. The inner housing is placed within the accommodation room and includes a hollow cylinder extending from the front surface of a flange. The cover plate is placed to cover the access opening on the first wall. The shutter member is positioned within the accommodation room and includes a horizontal portion, a shutter plate, a connecting portion and a hook. The horizontal portion is positioned on the third wall. The connecting portion connects the horizontal portion with the shutter plate. The shutter plate extends from the connecting portion and into the accommodation room to arrive in front of the opening of the hollow cylinder. The hook extends from the horizontal portion and is configured to hook on to the flange.

According to the present disclosure, wherein an indentation is formed on the back surface of the flange, the hook is configured to hook on to the indentation.

According to the present disclosure, wherein the indentation is formed on an edge of the back surface of the flange.

According to the present disclosure, wherein the hook includes a horizontal portion connects to a vertical portion, the vertical portion is configured to be attached to the indentation.

According to the present disclosure, wherein the hook is configured to hook on to the back surface of the flange.

According to the present disclosure, wherein a protrusion is formed on the third wall to stop the horizontal portion from being further moved toward the flange.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 4:
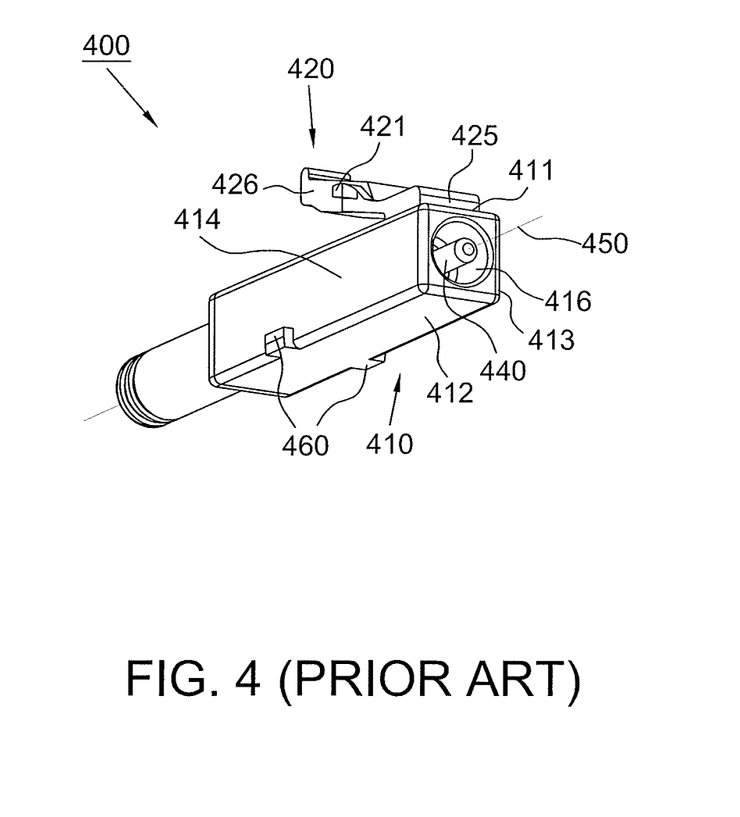
FIG. 4 is an elevated perspective view of a conventional LC type optical fiber connector.

Referring to FIG. 4, a conventional LC type optical fiber connector 400 has a generally rectangular shape with a square cross section. The connector 400 includes a rectangular hollow housing 410 comprised of a top side-wall 411, a bottom side-wall 412, a right side-wall 413 and a left side-wall 414, wherein the right side-wall 413 is opposite to the left side-wall 414 and connects with the bottom side-wall 412 and the top side-wall 411. A latch 420 is molded into the top side-wall 411 and includes a living hinge 425 which allows the tab 426 to be moved up and down in a direction perpendicular to the central axis 450-450 of the connector 400. The latch 420 also includes a pair of protrusions 421 that are positioned on opposing sides of the tab 426. In addition, a ferrule 440 protrudes from a circular opening 416 on the front end of the housing 410. A spring is located inside the housing 410 to allow the ferrule 440 to move back and forth through the opening 416 (not shown in the figure). A pair of protrusions 460 is positioned on the right side-wall 413 and left side-wall 414, respectively.

Figure 5:
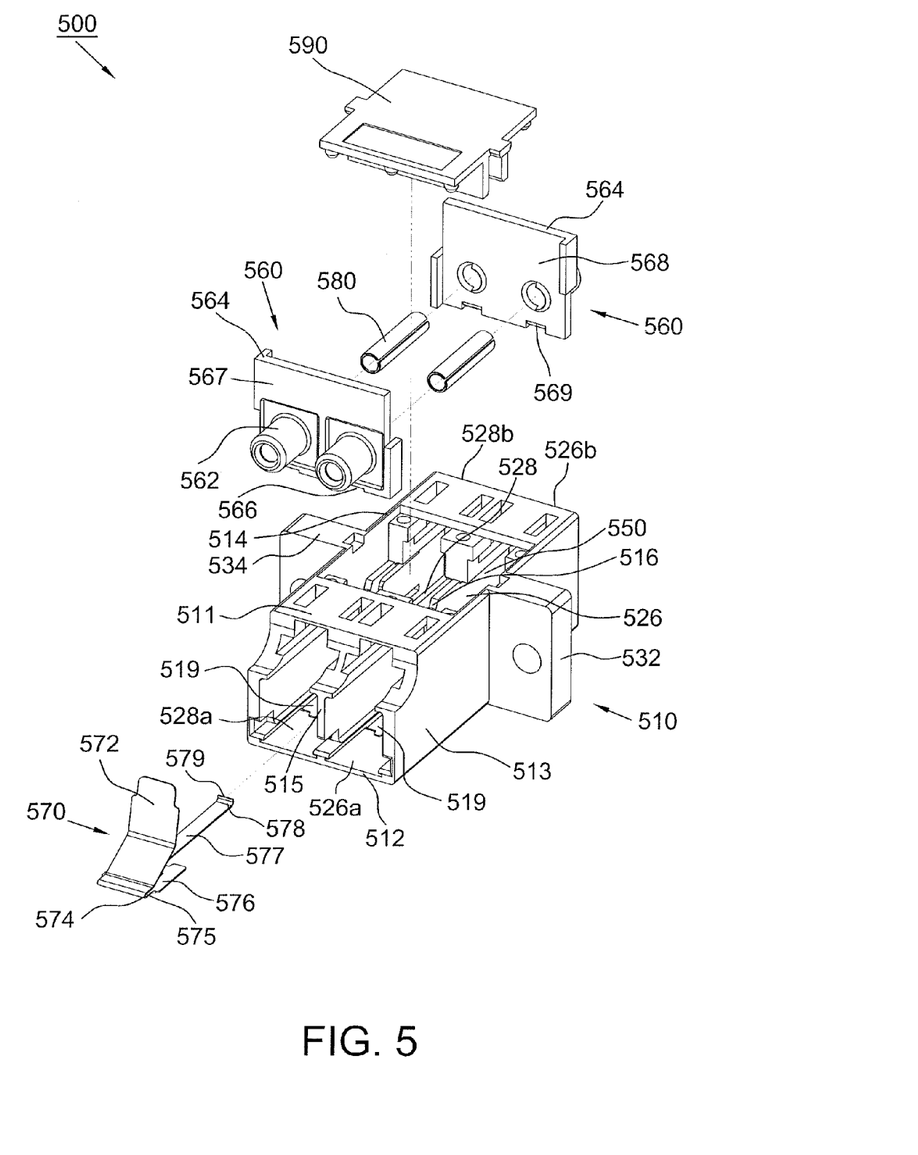
FIG. 5 is an exploded view of the optical fiber adapter of the present disclosure.

Referring to FIG. 5, the optical fiber adapter 500 according to the present disclosure includes a unitary molded plastic main body 510, an elastic shutter member 570, a pair of inner housings 560, two sleeves 580 and a plastic cover plate 590. The main body 510 has an axial accommodation room defined by a top side-wall 511, a bottom side-wall 512, a right side-wall 513 and a left side-wall 514. The axial accommodation room is divided into two halves by a compartment wall 515 that is parallel to the right side-wall 513 and left side-wall 514 and connects with the top side-wall 511 and bottom side-wall 512. The half of the axial accommodation room defined by the top side-wall 511, bottom side-wall 512, compartment wall 515 and right side-wall 513 is named as the right axial accommodation room 526, which has opposing first right opening 526a and second right opening 526b in the axial direction. The other half of the axial accommodation room defined by the top side-wall 511, bottom side-wall 512, compartment wall 515 and left side-wall 514 is named as the left axial accommodation room 528, which has opposing first left opening 528a and second left opening 528b in the axial direction. A break 516 is formed in the middle section of the compartment wall 515. Located on the exterior of the main body 510 is a pair of tabs 532 and 534. One tab 532 is located on the right side-wall 513 and the other tab 534 is located on the left side-wall 514. The tabs 532 and 534 are operative in supporting the adapter 500 on a surface. An access opening 550 is located on the top side-wall 511. The access opening 550 allows the inner housings 560 to be placed within the axial accommodation room of the main body 510. In addition, two protrusions 519 are formed on the bottom side-wall 512 of the left and right axial accommodation rooms 528, 526, respectively.

The inner housing halves 560 are identical. Each of the inner housing halves 560 is constructed of plastics by an injection molding process. Each of the inner housing halves 560 includes two hollow cylinders 562 and a rectangular flange 564 located at the front surface 567 of the cylinder 562. Two inner housing halves 560 are connected at their respective flanges 564 respectively so as to define two common cylinders. Two flanges 564 define a thickness which is equal to the width of the break 516 of the compartment wall 515. In addition, two indentations 566 are formed on the edge of each of the flange 564 and two indentations 569 are formed on the back surface 568 of the flange 564, wherein the indentations 566 are in communication with the indentations 569, respectively.

The cylinders 562 of the inner housing halves 560 are coaxial in the main body 510 and define two common cylinders. Located in each of the common cylinders is the hollow sleeve 580 with a generally cylindrical shape. The cover plate 590 is positioned to cover the access opening 550 and may be ultrasonically welded to the main body 510.

The elastic shutter member 570 is integrally formed with metal. The shutter member 570 includes a shutter plate 572, a connecting portion 574, a horizontal portion 576 and a hook 578. The connecting portion 574 connects the horizontal portion 576 with the shutter plate 572 and is generally C-shaped. That is, the connecting portion 574 is curved and has a notch 575. The shutter plate 572 may contain a single plate or double plates. The shutter plate 572 may move with respect to the horizontal portion 576 and the angle between the above two elements is smaller than 90 degrees. The shutter plate 572 is moved close to the horizontal portion 576 with a push force and quickly moves back when the push is withdrawn. The hook 578 extends from the horizontal portion 576, which is comprised of a horizontal portion 577 and a vertical portion 579. The horizontal portion 577 extends from the horizontal portion 576 and the vertical portion 579 extends upward from one end of the horizontal portion 577.

Figure 6:
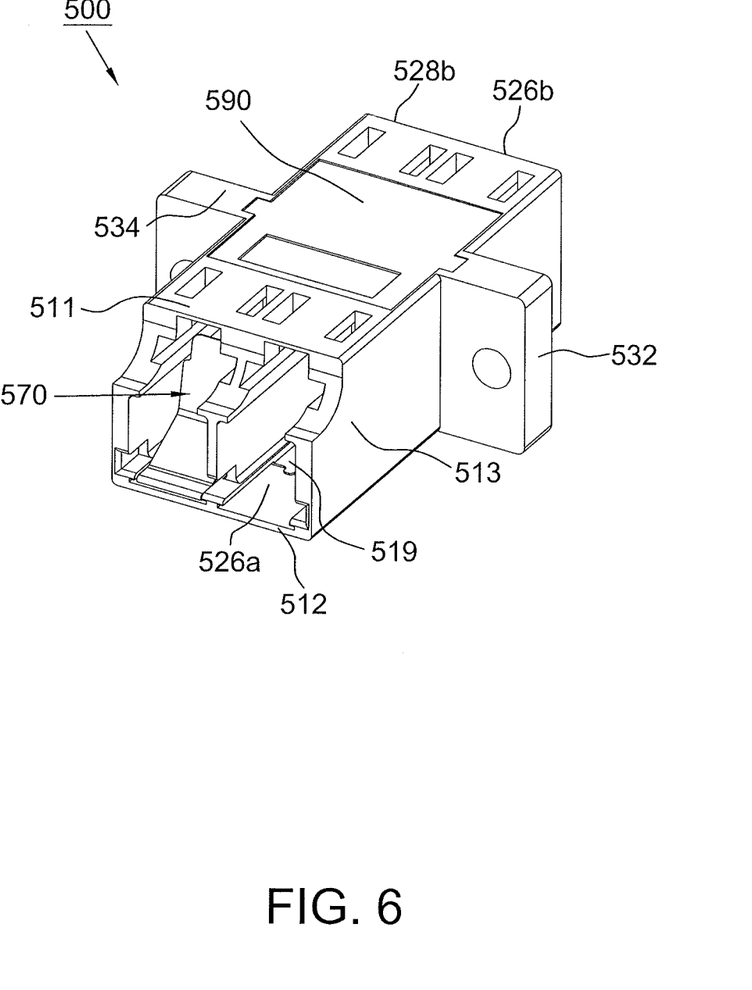
FIG. 6 is an elevated perspective view of the optical fiber adapter of the present disclosure.

Referring to FIG. 6, when desiring to assemble the optical fiber adapter 500, the shutter member 570 is pushed into the left axial accommodation room 528 through the opening 528a. Afterward, the inner housing halves 560 is inserted into the axial accommodation room of the main body 510 in such a manner that the flanges 564 of the inner housing halves 560 are placed in the break 516 of the compartment wall 515. The horizontal portion 577 of the hook 578 extends through one indentation 566 on one flange 564 and the vertical portion 579 of the hook 578 is positioned within one indentation 569 on the back surface 568 of the flange 564. Subsequently, the cover plate 590 is brought to cover the access opening 550 and is ultrasonically welded to the main body 510.

According to the optical fiber adapter 500 of the present disclosure, the horizontal portions 576 and 577 will be attached to the bottom side-wall 512 when the shutter member 570 is moved to being in place. The protrusion 519 on the bottom side-wall 512 may stop the horizontal portion 576 from being further pushed toward the flange 564 when the shutter member 570 is pushed into the left axial accommodation room 528. This may prevent the hook 578 from bumping against the back surface 568 of the opposing flange 564.

According to the optical fiber adapter 500 of the present disclosure, the hook 578 will hook on to the back surface 568 of the flange 564 when a pull force is exerted on the shutter member 570. Consequently, the hook 578 may prevent the shutter member 570 from being pulled out of the main body 510.

According to the optical fiber adapter 500 of the present disclosure, the shutter plate 572 will be located in front of the opening of the hollow cylinder 562 when the shutter member 570 is positioned in place. This way the light beams emitted from the cylinder 562 may be obstructed thereby preventing a user's eyes from exposure to the harmful light beams.

Figure 7:
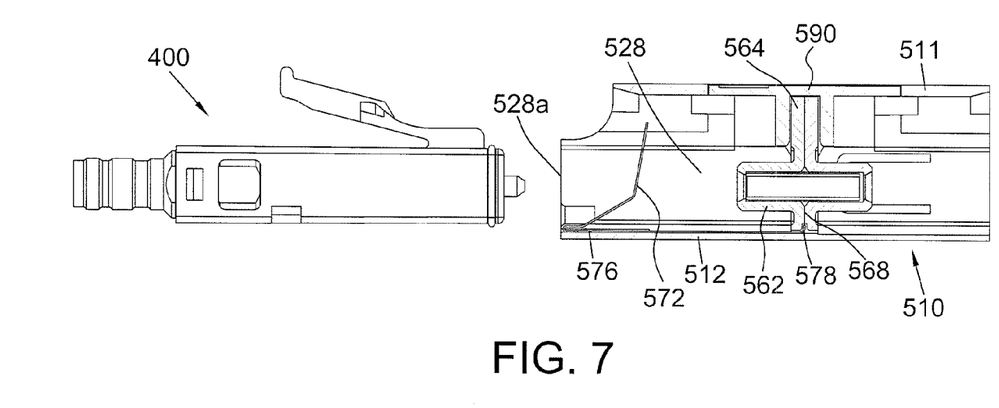
FIGS. 7 and 8 illustrate how to mate an optical fiber connector with the optical fiber adapter of the present disclosure.
Figure 8:
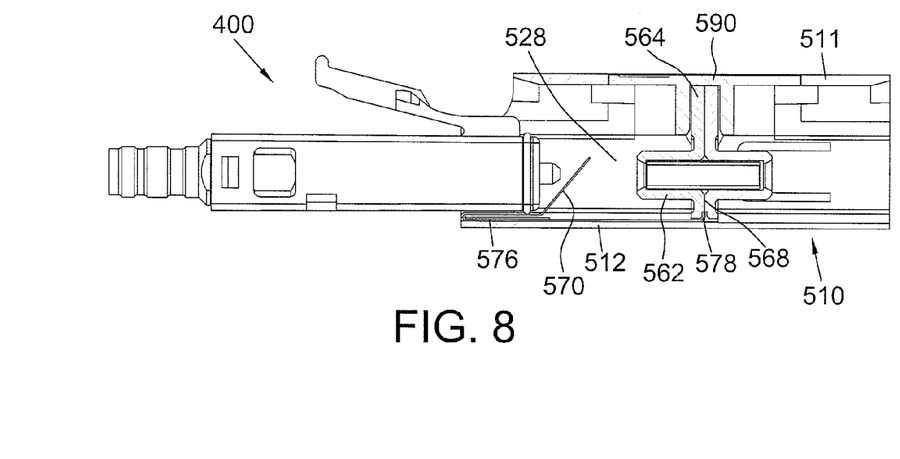

Referring to FIGS. 7 and 8, according to the optical fiber adapter 500 of the present disclosure, there is no need to detach the shutter member 570 from the main body 510 prior to inserting the optical fiber connector 400 into the left axial accommodation room 528 of the main body 510. When the connector 400 is inserted into the main body 510, it will push down the elastic shutter plate 572 to the gap between the connector 400 and the bottom side-wall 512 of the main body 510. Upon pulling out the connector 400, the elastic shutter plate 572 will quickly spring up to an original position to obstruct the light beams emitted from the cylinder 562 as a result of elasticity. As a result, the occurrence of exposure to the harmful light beams may be avoided.

Although the shutter member is installed in the left axial accommodation room of the main body as described in the present disclose, it will be appreciated that the shutter member may be arranged in either or both of left and right axial accommodation rooms. In addition, it will also be appreciated that although the disclosure has been explained with the LC duplex adapter, the shutter member of the present disclosure may be used in LC simplex adapter, SC duplex adapter, SC simplex adapter, or other types of adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
  a main body having an accommodation room defined by a first wall, a second wall, a third wall and a fourth wall, the first wall facing the third wall and connecting with the second and fourth walls, wherein the accommodation room has a first opening opposing to a second opening configured to allow an optical fiber connector to be inserted into the accommodation room, and an access opening is formed on the first wall;
  an inner housing positioned within the accommodation room, the inner housing including:
    a flange having a front surface opposing to a back surface; and
    a hollow cylinder extending from the front surface of the flange;
  a cover plate positioned to cover the access opening on the first wall; and
  an elastic shutter member, including:
    a horizontal portion positioned within the accommodation room and on the third wall, wherein a portion of the horizontal portion is sandwiched between the flange and the third wall;
    a shutter plate;
    a connecting portion connecting the horizontal portion with the shutter plate; and
    a hook extending from the horizontal portion, wherein the hook is configured to hook on to the flange;
  wherein the shutter plate extends from the connecting portion and into the accommodation room to arrive in front of an opening of the hollow cylinder, and
  wherein the access opening is configured to allow the inner housing to pass through the access opening to be placed within the accommodation room.

2. The optical fiber adapter as claimed in claim 1, wherein an indentation is formed on the back surface of the flange, the hook is configured to hook on to the indentation.

3. The optical fiber adapter as claimed in claim 2, wherein the indentation is formed on an edge of the back surface of the flange.

4. The optical fiber adapter as claimed in claim 2, wherein the hook comprises a vertical portion connected with the horizontal portion, and the vertical portion is configured to be attached to the indentation.

5. The optical fiber adapter as claimed in claim 4, further comprising another inner housing positioned within the accommodation room, wherein the vertical portion of the hook is sandwiched between the flanges of the two inner housings.

6. The optical fiber adapter as claimed in claim 1, wherein the hook is configured to hook on to the back surface of the flange.

7. The optical fiber adapter as claimed in claim 1, wherein a protrusion is formed on the third wall to stop the horizontal portion from being further moved toward the flange.

8. An optical fiber adapter, comprising:
  a main body having an accommodation room defined by a first wall, a second wall, a third wall and a fourth wall, the first wall facing the third wall and connecting with the second and fourth walls, wherein the accommodation room has a first opening opposing to a second opening, and an access opening is formed on the first wall;
  an inner housing positioned within the accommodation room, the inner housing including:
    a flange having a front surface opposing to a back surface; and
    a hollow cylinder extending from the front surface of the flange;
  a cover plate positioned to cover the access opening on the first wall; and
  an elastic shutter member, including:

a horizontal portion positioned within the accommodation room and on the third wall;
a shutter plate;
a connecting portion connecting the horizontal portion with the shutter plate; and
a hook extending from the horizontal portion, wherein the hook is configured to hook on to the flange;
wherein the shutter plate extends from the connecting portion and into the accommodation room to arrive in front of an opening of the hollow cylinder; and
wherein a protrusion is formed on the third wall to stop the horizontal portion from being further moved toward the flange.

* * * * *